United States Patent
Robertson (10) Patent No.: US 10,567,357 B2
(45) Date of Patent: Feb. 18, 2020

(54) SECURE TRANSMISSION SYSTEM WITH UPGRADED ENCRYPTION STRENGTH

(71) Applicant: ZixCorp Systems, Inc., Dallas, TX (US)

(72) Inventor: David Joseph Robertson, Richardson, TX (US)

(73) Assignee: ZixCorp Systems, Inc., Dallas, TX (US)

( * ) Notice: Subject to any disclaimer, the term of this patent is extended or adjusted under 35 U.S.C. 154(b) by 39 days.

(21) Appl. No.: 14/873,943

(22) Filed: Oct. 2, 2015

(65) Prior Publication Data

US 2017/0099269 A1   Apr. 6, 2017

(51) Int. Cl.
*H04L 29/06* (2006.01)
*H04L 9/14* (2006.01)
*H04L 9/08* (2006.01)

(52) U.S. Cl.
CPC ........ *H04L 63/0478* (2013.01); *H04L 9/0825* (2013.01); *H04L 9/14* (2013.01); *H04L 63/045* (2013.01); *H04L 63/30* (2013.01)

(58) Field of Classification Search
CPC ..... H04L 9/14; H04L 9/0825; H04L 63/0478; H04L 63/30
See application file for complete search history.

(56) References Cited

U.S. PATENT DOCUMENTS

| | | | |
|---|---|---|---|
| 5,557,346 A * | 9/1996 | Lipner | H04L 9/0894 380/285 |
| 5,633,929 A * | 5/1997 | Kaliski, Jr. | H04L 9/0894 380/28 |
| 5,799,086 A * | 8/1998 | Sudia | G06Q 20/02 380/286 |
| 6,246,771 B1 * | 6/2001 | Stanton | H04L 9/0894 380/286 |
| 6,483,920 B2 * | 11/2002 | Pinkas | H04L 9/0894 380/286 |
| 6,760,752 B1 | 7/2004 | Liu et al. | |
| 6,775,382 B1 * | 8/2004 | Al-Salqan | H04L 9/0894 380/280 |
| 7,353,204 B2 | 4/2008 | Liu | |
| 7,493,661 B2 | 2/2009 | Liu et al. | |
| 7,580,521 B1 * | 8/2009 | Spies | H04L 9/3073 380/281 |

(Continued)

*Primary Examiner* — Zachary A. Davis
(74) *Attorney, Agent, or Firm* — Baker Botts L.L.P.

(57) ABSTRACT

According to one embodiment, an apparatus is configured to receive a request to communicate a message including a body to an intended recipient and to receive a first public key of the intended recipient and a second public key of the intended recipient. The apparatus is further configured to encrypt the body using a first message key to produce a first encrypted body, to encrypt the first message key using the first public key to produce a first encrypted message key, to encrypt the first encrypted message key and the first encrypted body using a second message key to produce a second encrypted body, and to encrypt the second message key using the second public key to produce a second encrypted message key. The apparatus is also configured to communicate an encrypted message to the intended recipient, the encrypted message including the second encrypted message key and the second encrypted body.

24 Claims, 4 Drawing Sheets

(56) References Cited

U.S. PATENT DOCUMENTS

| | | | | |
|---|---|---|---|---|
| 7,676,040 B2* | 3/2010 | Augenstein | ......... | G06F 21/6218 380/259 |
| 7,925,009 B2* | 4/2011 | Schneider | ............ | H04L 9/0618 380/28 |
| 7,992,175 B2* | 8/2011 | Kahn | ................ | H04N 7/162 725/100 |
| 8,127,149 B1* | 2/2012 | Nachenberg | ........ | G06F 21/6218 713/193 |
| 8,468,244 B2* | 6/2013 | Redlich | ................ | G06Q 10/06 705/50 |
| 8,689,340 B2* | 4/2014 | Mantin | ............ | G11B 20/00086 380/277 |
| 9,106,411 B2* | 8/2015 | De Atley | ............. | H04L 9/0861 |
| 9,137,480 B2* | 9/2015 | Schlarb | ................ | G06F 21/10 |
| 9,276,887 B2* | 3/2016 | Jalisatgi | ................ | H04L 51/18 |
| 9,781,081 B1* | 10/2017 | Wasiq | ................ | H04L 63/0428 |
| 2004/0044627 A1* | 3/2004 | Russell | ................ | G06Q 20/00 705/50 |
| 2009/0182668 A1* | 7/2009 | Lee | ................ | H04L 63/0428 705/50 |
| 2014/0196079 A1* | 7/2014 | Jannard | ................ | H04L 9/0825 725/31 |
| 2017/0359173 A1* | 12/2017 | Mayers | ............. | H04L 63/0807 |

* cited by examiner

SECURE TRANSMISSION SYSTEM WITH UPGRADED ENCRYPTION STRENGTH

TECHNICAL FIELD

This disclosure relates generally to a system for encrypting messages.

BACKGROUND

Messages may be encrypted using various schemes to improve the security of the message and message communication.

SUMMARY OF THE DISCLOSURE

According to one embodiment, an apparatus includes a memory and a processor coupled to the memory. The processor is configured to receive a request to communicate a message to an intended recipient, the message comprising a body. The processor is further configured to receive a first public key of the intended recipient and a second public key of the intended recipient. The processor is further configured to encrypt the body using a first message key to produce a first encrypted body, to encrypt the first message key using the first public key to produce a first encrypted message key, to encrypt the first encrypted message key and the first encrypted body using a second message key to produce a second encrypted body, and to encrypt the second message key using the second public key to produce a second encrypted message key. The processor is also configured to communicate an encrypted message to the intended recipient, the encrypted message comprising the second encrypted message key and the second encrypted body.

According to one embodiment, an apparatus includes a memory and a processor coupled to the memory. The processor is configured to receive a request for a first public key and a second public key of an intended recipient of a message and, in response to receiving the request, to communicate the first public key and the second public key of the intended recipient. The message comprises a body and the body is encrypted using a first message key to produce a first encrypted body. The first message key is encrypted using the first public key to produce a first encrypted message key, the first encrypted message key and the first encrypted body are encrypted using a second message key to produce a second encrypted body, and the second message key is encrypted using the second public key to produce a second encrypted message key. An encrypted message is communicated to the intended recipient, the encrypted message comprising the second encrypted message key and the second encrypted body.

According to another embodiment, a method includes receiving a request to communicate a message to an intended recipient, the message comprising a body. The method further includes receiving a first public key of the intended recipient and a second public key of the intended recipient. The method further includes encrypting, by a processor, the body using a first message key to produce a first encrypted body; encrypting, by the processor, the first message key using the first public key to produce a first encrypted message key; encrypting, by the processor, the first encrypted message key and the first encrypted body using a second message key to produce a second encrypted body; and encrypting, by the processor, the second message key using the second public key to produce a second encrypted message key. The method also includes communicating an encrypted message to the intended recipient, the encrypted message comprising the second encrypted message key and the second encrypted body Certain embodiments may provide one or more technical advantages. For example, an embodiment may improve the strength of the encryption of a message. As another example, an embodiment may improve the security of a message. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 4 of the drawings, like numerals being used for like and corresponding parts of the various drawings.

Messages may be encrypted using various schemes to improve the security of the message and message communication. For example, messages may be encrypted using AES, Triple DES, RC4, RSA, and/or Rabin encryption. However, once one scheme is chosen and implemented it may be difficult to later change the encryption scheme or to add another encryption scheme. This disclosure contemplates a system that may allow for encryption schemes to be changed and/or added.

In certain embodiments, a system may encrypt the body of a message using a first encryption scheme. Then, the system may encrypt the encrypted body and any keys used to encrypt the body using a second encryption scheme. In this manner, layers of encryption may be added onto existing layers of encryption. An example of the system will be described generally using FIG. 1. An example of specific operation of the system will be described using FIGS. 2 through 4.

Figure 1:
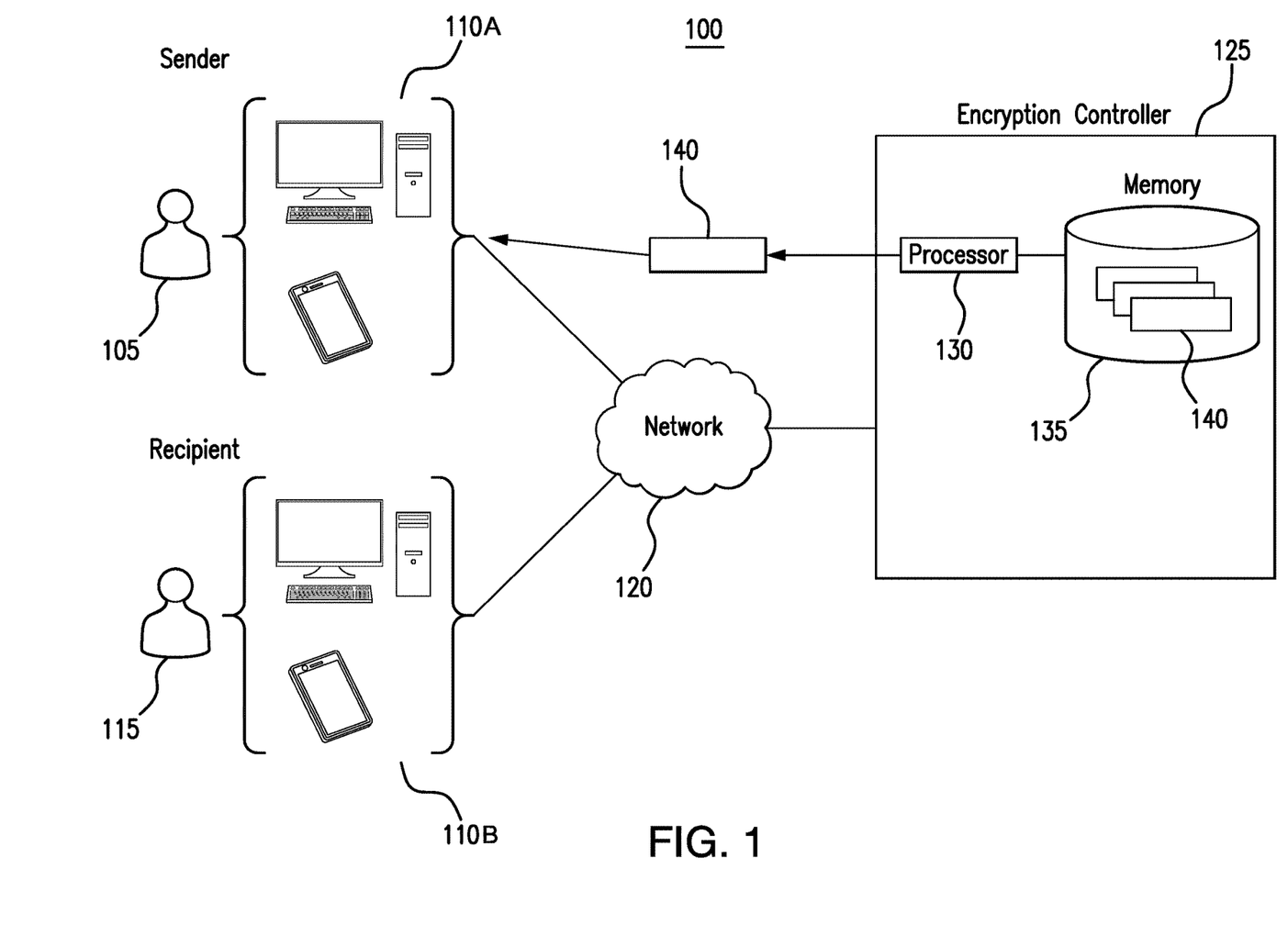
FIG. 1 illustrates an example system for encrypting messages.

FIG. 1 illustrates an example system 100 for encrypting messages. As provided in FIG. 1, system 100 may include sender 105, devices 110, recipient 115, network 120, and encryption controller 125.

Sender 105 may use device 110A to communicate a message to recipient 115. The message may be any appropriate type of message such as, for example, email messages, text messages and/or chat messages. This disclosure contemplates the systems and methods described herein being applied to the communication of any appropriate type of message.

Sender 105 may use device 110A to compose and/or communicate a message to recipient 115. When device 110A receives an indication or request to communicate the message to recipient 115, device 110A may encrypt the message before communicating the message. This encryption will be described in more detail using FIGS. 2 and 3. When device 110B of recipient 115 receives the message, device 110B of recipient 115 may decrypt the message. Recipient 115 may then read the message.

This disclosure contemplates devices 110 being any appropriate devices for sending and receiving communications over network 120. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, a keypad, or other appropriate terminal equipment usable by sender 105 or recipient 115. In some embodiments, an application executed by device 110 may perform the functions described herein.

Network 120 may facilitate communication between and amongst various components of system 100 such as, for example, devices 110 and encryption controller 125. This disclosure contemplates network 120 being any suitable network operable to facilitate communication between the components of system 100. Network 120 may include any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Encryption controller 125 may facilitate the various encryption schemes implemented by system 100. As provided in FIG. 1, encryption controller 125 may include processor 130 and memory 135. Processor 130 may be communicatively coupled to memory 135. This disclosure contemplates processor 130 and memory 135 being configured to perform any of the functions of encryption controller 125 described herein. In particular embodiments, encryption controller 125 may store public keys 140 of the users of system 100. For example, encryption controller 125 may store public keys 140 of sender 105 and/or recipient 115. Public keys 140 may be used to implement various encryption schemes. When encryption controller 125 detects that sender 105 has requested device 110A to communicate a message to recipient 115, encryption controller 125 may communicate public keys 140 of recipient 115 to device 110A of sender 105 so that device 110A may encrypt the message.

Processor 130 may execute software stored on memory 135 to perform any of the functions described herein. Processor 130 may control the operation and administration of encryption controller 125 by processing information received from network 120 and memory 135. Processor 130 may include any hardware and/or software that operates to control and process information. Processor 130 may be a programmable logic device, a microcontroller, a microprocessor, any suitable processing device, or any suitable combination of the preceding.

Memory 135 may store, either permanently or temporarily, data, operational software, or other information for processor 130. Memory 135 may include any one or a combination of volatile or non-volatile local or remote devices suitable for storing information. For example, memory 135 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 135, a disk, a CD, or a flash drive. In particular embodiments, the software may include an application executable by processor 130 to perform one or more of the functions described herein.

When device 110B of recipient 115 receives the encrypted message, device 110B may decrypt the message so that recipient 115 may read the message. If the message has been encrypted several times, device 110B may decrypt the message several times so that recipient 115 may read the message.

In operation, system 100 may encrypt messages using various encryption schemes. To begin, sender 105 may use device 110A to generate a message. Sender 105 may then indicate to device 110A that the message should be communicated to recipient 115. When device 110A receives a request to communicate the message to recipient 115, device 110A may request public keys 140 of recipient 115 from encryption controller 125 to encrypt the message.

Encryption controller 125 may detect the request for public keys 140. In response, encryption controller 125 may communicate public keys 140 to device 110A of sender 105. After receiving public keys 140, device 110A may encrypt the message using various encryption schemes associated with public keys 140. Device 110A may then communicate the encrypted message to device 110 of recipient 115.

When device 110B of recipient 115 receives the encrypted message, device 110B may use a locally-stored (at time of creation of public and private key pairs) private key of recipient 115 to decrypt the message. After the message has been decrypted, device 110B may present the message to recipient 115 and recipient 115 may read the message.

In certain embodiments, by using system 100, message encryption may be improved. In some embodiments, by using system 100 the security of a communicated message and/or the security of the communication itself may be improved.

Modifications, additions, or omissions may be made to system 100 without departing from the scope of the invention. For example, the components of system 100 may be integrated or separated.

The encryption performed by system 100 will be discussed in more detail using FIGS. 2 through 4. In general, the encryption performed by system 100 involves encrypting a message using a first encryption scheme and then encrypting the encrypted message using a second encryption scheme. In this manner, system 100 may be used to add and/or combine any number of layers of encryption schemes.

Figure 2:
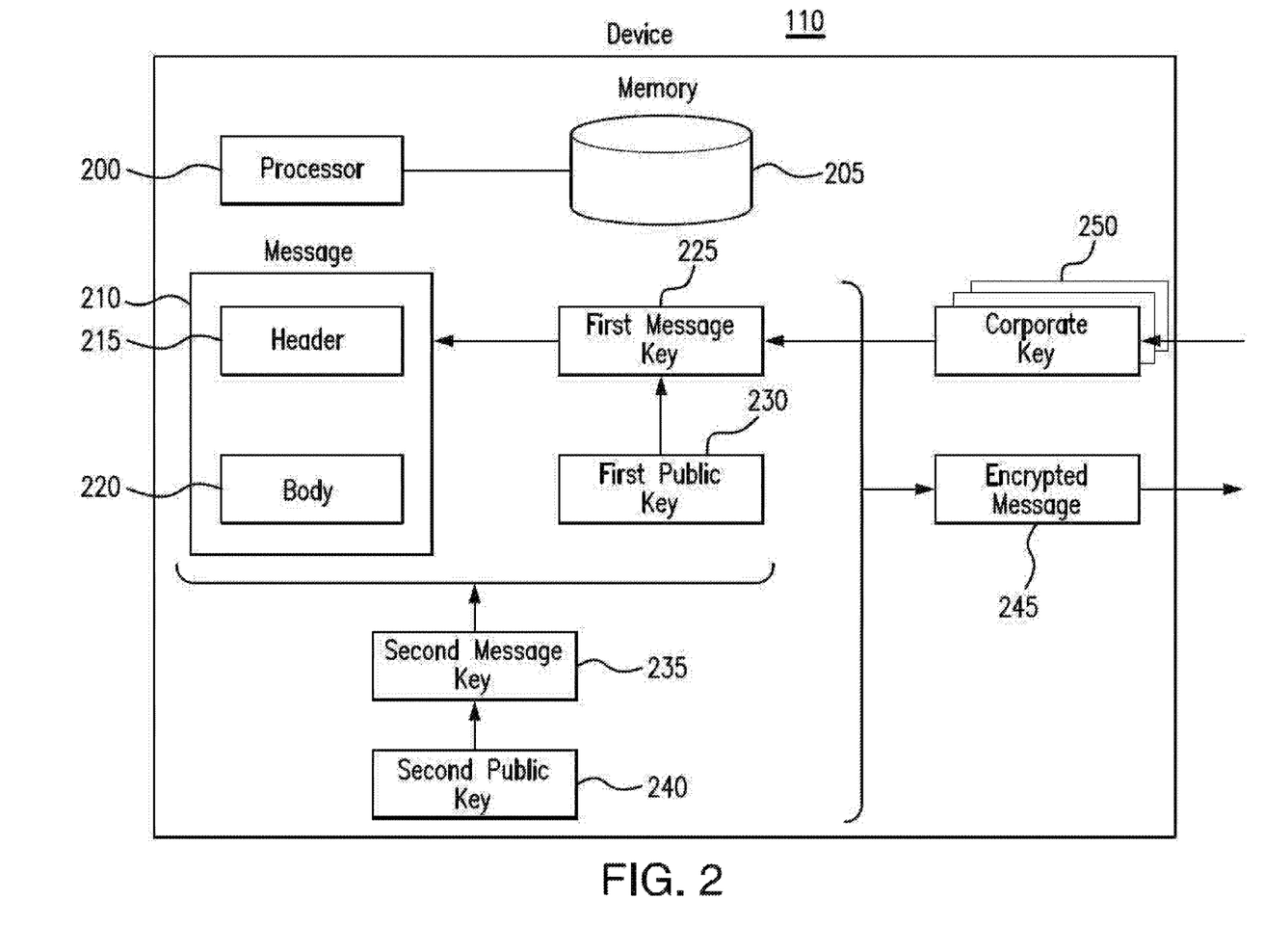
FIG. 2 illustrates a device of the system of FIG. 1.

FIG. 2 illustrates a device 110 of the system 100 of FIG. 1. Device 110 may be used to encrypt a message 210. As provided in FIG. 2, device 110 includes a processor 200 communicatively coupled to a memory 205. This disclosure contemplates processor 200 and memory 205 being configured to perform any of the functions of device 110 described herein.

Processor 200 may execute software stored on memory 205 to perform any of the functions described herein. Processor 200 may control the operation and administration of device 110 by processing information received from network 120 and memory 205. For example, processor 200 may be configured to perform the various encryption schemes of device 110. Processor 200 may include any hardware and/or software that operates to control and process information. Processor 200 may be a programmable logic device, a microcontroller, a microprocessor, any suitable processing device, or any suitable combination of the preceding.

Memory 205 may store, either permanently or temporarily, data, operational software, or other information for processor 200. Memory 205 may include any one or a combination of volatile or non-volatile local or remote devices suitable for storing information. For example, memory 205 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 205, a disk, a CD, or a flash drive. In particular embodiments, the software may include an application executable by processor 200 to perform one or more of the functions described herein.

Device 110 may generate message 210. In particular embodiments, message 210 may be an email message. This disclosure contemplates message 210 being any appropriate type of message including text messages and/or chat messages. Message 210 may include a header 215 and a body 220.

Header 215 may include information that is used to communicate message 210. For example, header 215 may include identifiers for an intended recipient 115 of message 210. Header 215 may also include identifying information for a sender 105 of message 210. This disclosure contemplates header 215 including any appropriate type of information. In particular embodiments, header 215 may include first and second extensible groups of fields. The first extensible group of fields may include identifying information for sender 105 and recipient 115, such as for example email addresses, phone numbers, usernames, etc. The second extensible group of fields may include encrypted keys, such as for example an encrypted second message key 235 and a doubly encrypted first message key 225. This disclosure contemplates header 215 including any number of fields and any number of keys.

Body 220 may include text and/or information that should be presented to the intended recipient 115 of message 210. For example, if message 210 is an email message, body 220 may include text that intended recipient 115 should read.

After message 210 is generated, device 110 may receive a request to communicate message 210 to the intended recipient 115. Device 110 may then encrypt message 210 using a first message key 225. In particular embodiments, first message key 225 may be generated by device 110 and/or received by device 110 from encryption controller 125. In certain embodiments, device 110 may encrypt body 220 using first message key 225. This disclosure contemplates encrypting body 220 using any appropriate type of encryption such as, for example, Triple DES and/or AES-128 encryption. In particular embodiments, first message key 225 may be a random symmetric key.

Device 110 may then encrypt first message key 225 with a first public key 230. First public key 230 may be generated by device 110 and/or received from encryption controller 125. In particular embodiments, first public key 230 may be assigned to the intended recipient 115 of message 210. This disclosure contemplates encrypting first message key 225 using any appropriate type of encryption such as, for example, Rabin encryption and/or RSA-1024 encryption.

Device 110 may then encrypt the encrypted body 220 and the encrypted first message key 225 using a second message key 235, In particular embodiments, second message key 235 may be generated by device 110 and/or received from encryption controller 125. This disclosure contemplates encrypting encrypted body 220 and the encrypted first message key 225 using any appropriate encryption scheme such as, for example, AES-192 encryption and AES-256 encryption. In particular embodiments, second message key 235 may be a random symmetric key. In particular embodiments, encrypting the encrypted body 220 and the encrypted first message key 225 using second message key 235 may produce a second encrypted body. In other words, second encrypted body includes the doubly encrypted body 220 and the doubly encrypted first message key 225.

Device 110 may then encrypt second message key 235 using second public key 240. In particular embodiments, second public key 240 may be generated by device 110 and/or received from encryption controller 125. Second public key 240 may be assigned to the intended recipient 115 of message 210. This disclosure contemplates encrypting second public message key 235 using any appropriate type of encryption such as, for example, RSA-2048 encryption, RSA-3072 encryption, and/or elliptic curve encryption.

Device 110 may then generate an encrypted message 245 that includes header 215, the second encrypted body, and the encrypted second message key 235. As a result, encrypted message 245 may include body 220, which has been encrypted using both first message key 225 and second message key 235. Device 110 may then communicate encrypted message 245 to the intended recipient 115.

In particular embodiments, encryption controller 125 may communicate first public key 230 and second public key 240 to device 110 in response to a request from device 110 for first public key 230 and second public key 240. Device 110 may communicate this request in response to sender 105 requesting that message 210 be communicated to recipient 215.

After the intended recipient 115 receives encrypted message 245, the intended recipient 115 may use a first local private key and a second local private key to decrypt encrypted message 245. For example, the intended recipient 115 may first decrypt encrypted message 245 using its second local private key to extract second message key 235 and the second encrypted body. The intended recipient 115 may then use second message key 235 to decrypt the second encrypted body to extract the encrypted body 220 and the encrypted first message key 225. The intended recipient may then use its first local private key to decrypt the encrypted first message key 225. The intended recipient may then use the first message key 225 to decrypt the encrypted body 220. The intended recipient may then read the body 220 of message 210.

By following the process described above, any number of encryption schemes may be used to encrypt message 210. Furthermore, in particular embodiments, device 110 may further encrypt message 210 such that a user other than the intended recipient 115 may decrypt message 210. Allowing another user to decrypt message 210 may be useful in certain contexts such as, for example, legal discovery. To allow another user to decrypt message 210, device 110 may encrypt body 220 with first message key 225 to produce encrypted body 220 as discussed above. Device 110 may then encrypt first message key 225 with a first corporate monitor key 250. In particular embodiments, first corporate monitor key 250 may be generated by device 110 and/or received from encryption controller 125. This encryption may produce a first corporate monitor encrypted message key.

Device 110 may encrypt the encrypted body 220, the encrypted first message key 225, and the first corporate monitor encrypted message key using second message key 235 to produce the second encrypted body. In other words, the second encrypted body may include the doubly encrypted body 220, the doubly encrypted first message key 225, and the encrypted first corporate monitor key 250. Device 110 may also encrypt second message key 235 using a second corporate monitor key 250. In particular embodiments, second corporate monitor key 250 may be generated by device 110 and/or received from encryption controller 125. This encryption may produce a second corporate monitor encrypted message key.

Device 110 may then include the second corporate monitor encrypted message key in encrypted message 245. In this manner, encrypted message 245 may include header 215, the second encrypted body, the second corporate monitor encrypted message key, and the encrypted second message key 235.

When the intended recipient 115 receives encrypted message 245, the intended recipient 115 may still decrypt encrypted message 245 using the process discussed above involving a first local private key and a second local private key. Furthermore, when a user assigned to first corporate monitor key 250 and second corporate monitor key 250 opens and/or receives encrypted message 245, that user may decrypt encrypted message 245 using a second local corporate monitor private key to extract second message key 235 from the second corporate monitor encrypted message key. Second message key 235 may then be used to decrypt the second encrypted body to extract the first corporate monitor encrypted message key and the encrypted body 220. The user may then use a first local corporate monitor private key to decrypt the first corporate monitor encrypted message key to extract first message key 225. The user may then use first message key 225 to decrypt encrypted body 220. In this manner, a user other than the intended recipient of message 210 may access the body 220 of message 210.

In certain embodiments, device 110 may receive first corporate monitor key 250 and second corporate monitor key 250 in response to a determination that: (1) sender 105 and/or recipient 115 belong to a particular domain, and (2) an authorized third party should be associated with the particular domain. For example, first corporate monitor key 250 and second corporate monitor key 250 may be received in response to a determination that: (1) one or more of sender 105 and recipient 115 belong to a particular corporate domain; and (2) an authorized third party associated with the corporate monitor keys has the capability to decrypt messages to or from a particular domain. In particular embodiments, encryption controller 125 may make the determination whether one or more of sender 105 and recipient 115 belong to the particular domain. Because one or more of sender 105 and recipient 115 belong to the particular domain such as, for example, a corporate domain, it may be important to allow an authorized third party access to message 210 such as, for example, for purposes of legal discovery. The other user may belong, but need not belong, to the particular domain. In this manner, the security and encryption of message 210 may be maintained while granting access to other users with appropriate authority.

In particular embodiments, device 110 may further utilize a transaction certificate to certify delivery. The transaction certificate may be requested and/or received by device 110 from encryption controller 125. Device 110 may add the transaction certificate to message 210 before encrypting body 220 using first message key 225. When the intended recipient of message 210 receives message 210 with the transaction certificate, the intended recipient may certify receipt of message 210. In particular embodiments, device 110 may receive the receipt, which indicates to sender 105 that message 210 has been received by the intended recipient 115.

In certain embodiments, device 110 may lock message 210 by encrypting first message key 225 using first public key 230 and then further encrypting the encrypted first message key 225 using a third message key. The third message key may be provided by a third party to the sender and the intended recipient of message 210. This encryption may produce a locked message key. Device 110 may then encrypt the encrypted body 220 and the locked message key using second message key 235 to produce the second encrypted body. In this manner, the encrypted first message key 225 may be replaced by the locked message key. When the intended recipient 115 receives encrypted message 245, the intended recipient will need to contact the third party to receive the third message key that will unlock message 210. In this manner, the security of message 210 and/or the communication of message 210 may be further improved.

Figure 3:
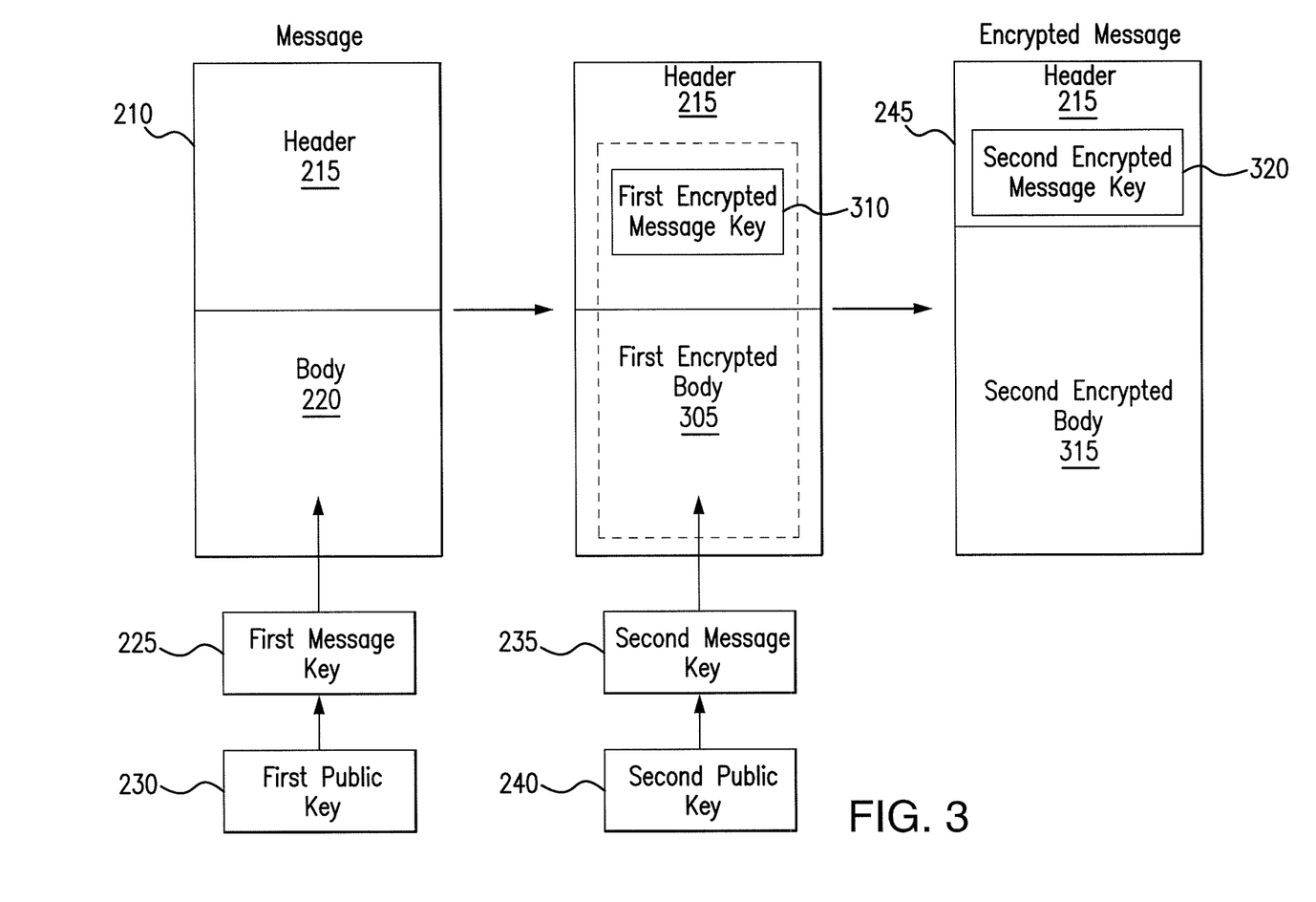
FIG. 3 illustrates an encryption performed using the system of FIG. 1.

FIG. 3 illustrates an encryption performed using the system 100 of FIG. 1. As provided in FIG. 3, message 210 may be encrypted to produce encrypted message 245. As a first step, body 220 of message 210 may be encrypted using first message key 225 to produce a first encrypted body 305. Then, first message key 225 may be encrypted using first public key 230 to produce a first encrypted message key 310. An intermediate message may be generated that includes first encrypted body 305 and adds first encrypted message key 310 to header 215.

First encrypted message key 310 and first encrypted body 305 may then be encrypted using second message key 235 to produce second encrypted body 315. Second message key 235 may then be encrypted using second public key 240 to produce a second encrypted message key 320. Encrypted message 245 may then be generated to include header 215 and second encrypted body 315. Second encrypted message key 320 may be included in header 215.

Figure 4:
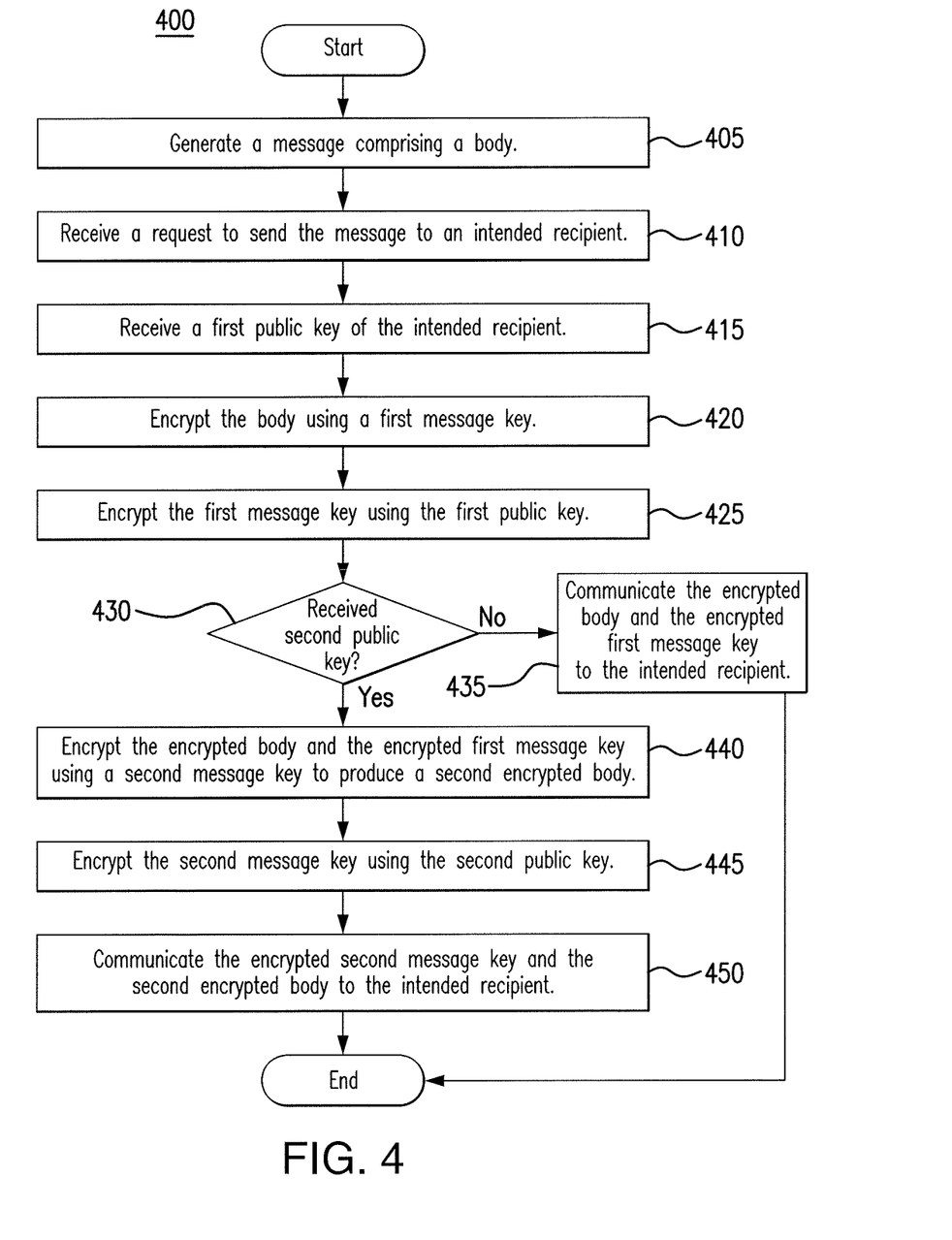
FIG. 4 is a flowchart illustrating a method of encrypting a message using the system of FIG. 1.

FIG. 4 is a flowchart illustrating a method 400 of encrypting a message using the system 100 of FIG. 1. In particular embodiments, device 110 may perform method 400. By performing method 400, device 110 may improve the security of a message and/or the security of the communication of a message in certain embodiments.

Device 110 may generate a message comprising a body in step 405. Device 110 may then receive a request to send the message to an intended recipient in step 410. Device 110 may determine that the message should be encrypted before sending the message to the intended recipient.

Device 110 may receive a first public key of the intended recipient in step 415. In particular embodiments, the first public key may be received from encryption controller 125. The first public key may be assigned to the intended recipient. In step 420, device 110 may encrypt the body using a first message key. In particular embodiments, the first message key may be generated by device 110 and/or received from encryption controller 125. Device 110 may then encrypt the first message key using the first public key in step 425.

In step 430, device 110 may determine whether it received a second public key. In particular embodiments, the second public key may be received from encryption controller 125. The second public key may also be assigned to the intended recipient of the message. If device 110 has not received the second public key, device 110 may communicate the encrypted body and the encrypted first message key to the intended recipient in step 435.

If device 110 has received the second public key, device 110 may encrypt the encrypted body and the encrypted first message key using a second message key to produce a second encrypted body in step 440. Then, device 110 may encrypt the second message key using the second public key in step 445. Device 110 may then communicate the encrypted second message key and the second encrypted body to the intended recipient in step 450. In this manner, device 110 may perform multiple encryptions on the message. As a result, the security of the message and/or the communication of the message may be improved.

Modifications, additions, or omissions may be made to method 400 depicted in FIG. 4. Method 400 may include more, fewer, or other steps. For example, steps may be performed in parallel or in any suitable order. While discussed as device 110 performing the steps, any suitable component of system 100, such as encryption controller 125 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
a memory; and
a processor coupled to the memory, the processor configured to:
receive a request to communicate an intended message to an intended recipient, the intended message comprising a body;
receive a first public key of the intended recipient and a second public key of the intended recipient;
receive a first and a second corporate monitor key associated with an authorized third party, wherein the authorized third party is associated with a domain to which at least one of a sender or the intended recipient belongs;
encrypt the body using a first message key and a first encryption scheme to produce a first encrypted body;
encrypt the first message key using the first public key to produce a first encrypted message key;
encrypt the first message key using the first corporate monitor key to produce a first corporate monitor encrypted message key, wherein the first corporate monitor key is distinct from the first public key;
encrypt the first encrypted message key, the first encrypted body, and the first corporate monitor encrypted message key using a second message key and a second encryption scheme to produce a second encrypted body;
encrypt the second message key using the second public key to produce a second encrypted message key;
encrypt the second message key using the second corporate monitor key to produce a second corporate monitor encrypted message key, wherein the second corporate monitor key is distinct from the second public key; and
communicate an encrypted message to the intended recipient, the encrypted message comprising the second encrypted message key, the second encrypted body, and the second corporate monitor encrypted message key.

2. The apparatus of claim 1, wherein the processor is further configured to:
receive a transaction certificate; and
add the transaction certificate to the intended message to the intended recipient before encrypting the body using the first message key.

3. The apparatus of claim 1, wherein the processor is further configured to lock the encrypted message by:
encrypting the first encrypted message key with a third message key to produce a locked message key; and
producing a fourth encrypted body by encrypting the locked message key and the first encrypted body.

4. The apparatus of claim 1, wherein the first encryption scheme is one or more of Triple DES encryption and AES-128 encryption, and the second encryption scheme is one or more of AES-192 encryption and AES-256 encryption.

5. The apparatus of claim 1, wherein:
the second message key is encrypted by the second public key using one or more of RSA-2048 encryption, RSA-3072 encryption, and elliptic curve encryption; and
the first encrypted message key and the first encrypted body are encrypted using one or more of AES-192 encryption and AES-256 encryption.

6. The apparatus of claim 1, wherein the processor is further configured to receive a receipt indicating that the intended recipient received the encrypted message.

7. The apparatus of claim 1, wherein:
the intended message to the intended recipient further comprises a header, the header comprising a first extensible group of fields to communicate coded recipient email account address data and a second extensible group of fields to communicate encrypted key data; and
the second extensible group of fields comprises the second encrypted message key.

8. The apparatus of claim 1, wherein the first message key is a random symmetric key.

9. A system comprising:
a first memory and a second memory; and
a first processor coupled to the first memory, the first processor configured to:
receive, from a sender, a request for a first public key and a second public key of an intended recipient, the intended recipient being the recipient of an intended message;
in response to receiving the request, communicate the first public key and the second public key of the intended recipient to the sender;
determine whether at least one of the sender or the intended recipient belongs to a domain and whether an authorized party is associated with the domain; and
in response to determining that at least one of the sender or the intended recipient belongs to the domain and that the authorized third party is associated with the domain, communicate a first and a second corporate monitor key to the sender, wherein both the first and the second corporate monitor keys are associated with the domain and the authorized third party; and
a second processor coupled to the second memory, the second processor configured to:

receive a request to communicate the intended message to the intended recipient, wherein the intended message comprises a body;
receive the first public key of the intended recipient and the second public key of the intended recipient;
receive the first corporate monitor key and the second corporate monitor key;
encrypt the body using a first message key and a first encryption scheme to produce a first encrypted body;
encrypt the first message key using the first public key to produce the first encrypted message key;
encrypt the first message key using the first corporate monitor key to produce a first corporate monitor encrypted message key, wherein the first corporate monitor key is distinct from the first public key;
encrypt the first encrypted message key, the first encrypted body, and the first corporate monitor encrypted message key using a second message key and a second encryption scheme to produce a second encrypted body;
encrypt the second message key using the second public key to produce a second encrypted message key;
encrypt the second message key using the second corporate monitor key to produce a second corporate monitor encrypted message key, wherein the second corporate monitor key is distinct from the second public key; and
communicate an encrypted message to the intended recipient, the encrypted message comprising the second encrypted message key, the second encrypted body, and the second corporate monitor encrypted message key.

10. The system of claim 9, wherein the first processor is further configured to communicate a transaction certificate, wherein the transaction certificate is added to the intended message to the intended recipient before the body is encrypted using the first message key.

11. The system of claim 9, wherein the encrypted message is locked by:
encrypting the first encrypted message key with a third message key to produce a locked message key; and
producing a fourth encrypted body by encrypting the locked message key and the first encrypted body.

12. The system of claim 9, wherein the first encryption scheme is one or more of Triple DES encryption and AES-128 encryption, and the second encryption scheme is one or more of AES-192 encryption and AES-256 encryption.

13. The system of claim 9, wherein:
the second message key is encrypted by the second public key using one or more of RSA-2048 encryption, RSA-3072 encryption, and elliptic curve encryption; and
the first encrypted message key and the first encrypted body are encrypted using one or more of AES-192 encryption and AES-256 encryption.

14. The system of claim 9, wherein the first processor is further configured to receive a receipt indicating that the intended recipient received the encrypted message.

15. The system of claim 9, wherein:
the intended message to the intended recipient further comprises a header, the header comprising a first extensible group of fields to communicate coded recipient email account address data and a second extensible group of fields to communicate encrypted key data; and
the second extensible group of fields comprises the second encrypted message key.

16. The system of claim 9, wherein the first message key is a random symmetric key.

17. A method comprising:
receiving a request to communicate an intended message to an intended recipient, the intended message comprising a body;
receiving a first public key of the intended recipient and a second public key of the intended recipient;
receiving a first and a second corporate monitor key, wherein the first and second corporate monitor keys are associated with a domain and an authorized third party;
encrypting, by a processor, the body using a first message key and a first encryption scheme to produce a first encrypted body;
encrypting, by the processor, the first message key using the first public key to produce a first encrypted message key;
encrypting, by the processor, the first message key using the first corporate monitor key to produce a first corporate monitor encrypted message key, wherein the first corporate monitor key is distinct from the first public key;
encrypting, by the processor, the first encrypted message key, the first encrypted body, and the first corporate monitor encrypted message key using a second message key and a second encryption scheme to produce a second encrypted body;
encrypting, by the processor, the second message key using the second public key to produce a second encrypted message key;
encrypting, by the processor, the second message key using the second corporate monitor key to produce a second corporate monitor encrypted message key, wherein the second corporate monitor key is distinct from the second public key; and
communicating an encrypted message to the intended recipient, the encrypted message comprising the second encrypted message key, the second encrypted body, and the second corporate monitor encrypted message key.

18. The method of claim 17, further comprising:
receiving a transaction certificate; and
adding the transaction certificate to the intended message to the intended recipient before encrypting the body using the first message key.

19. The method of claim 17, further comprising locking the encrypted message by:
encrypting, by the processor, the first encrypted message key with a third message key to produce a locked message key; and
producing a fourth encrypted body by encrypting the locked message key and the first encrypted body.

20. The method of claim 17, wherein the first encryption scheme is one or more of Triple DES encryption and AES-128 encryption, and the second encryption scheme is one or more of AES-192 encryption and AES-256 encryption.

21. The method of claim 17, wherein:
the second message key is encrypted by the second public key using one or more of RSA-2048 encryption, RSA-3072 encryption, and elliptic curve encryption; and
the first encrypted message key and the first encrypted body are encrypted using one or more of AES-192 encryption and AES-256 encryption.

22. The method of claim 17, further comprising receiving a receipt indicating that the intended recipient received the encrypted message.

23. The method of claim 17, wherein:
the intended message to the intended recipient further comprises a header, the header comprising a first extensible group of fields to communicate coded recipient email account address data and a second extensible group of fields to communicate encrypted key data; and
the second extensible group of fields comprises the second encrypted message key.

24. The method of claim 17, wherein the first message key is a random symmetric key.

* * * * *